United States Patent Office
3,344,171
Patented Sept. 26, 1967

3,344,171
ISOMERIZATION OF TERPENES WITH A NOBLE METAL CATALYST IN THE PRESENCE OF HYDROGEN CHLORIDE
Seymour Lemberg, Elizabeth, N.J., assignor to International Flavors & Fragrances, Inc., New York, N.Y., a corporation of New York
No Drawing. Filed Sept. 23, 1964, Ser. No. 398,747
7 Claims. (Cl. 260—489)

This invention relates to the production of terpenes. More particularly it relates to the production of the valuable terpene 2,6-dimethyl-2,5,7-octatriene more commonly known as ocimene, and derivatives and analogs thereof by a novel catalytic process.

The invention provides a novel process for the isomerization of double bonds in olefinic systems and is especially useful for the isomerization of terpenes.

In accordance with this invention, terpenes such as ocimene, ocimenol and ocimenyl acylates are produced as mixtures of cis-trans isomers from myrcene, i.e., 2-methyl-6-methylene-2,7-octadiene or the corresponding myrcene derivatives. The process is also applicable to the production of allo-dihydromyrcene and the corresponding alcohol and esters from dihydromyrcene, its alcohol, or its esters. In this application, the term "dihydromyrcene" means 2,6-dimethyl-2,7-octadiene and the term "allo-dihydromyrcene" means 2,6-dimethyl-2,6-octadiene.

Terpenes of the type produced by this invention occur in many natural perfumes and cosmetics where they are especially prized because of the desirable odor characteristics they impart. It has long been a problem in the art to provide a commercially feasible synthesis of these compounds so as to make them available for incorporation in perfume mixtures and other compositions where aroma is important. The process of this invention provides a method for their production from the readily available compounds myrcene and dihydromyrcene.

The invention as applied to ocimene, allo-dihydromyrcene and their derivatives may be generally represented by the following formulas in which R is hydrogen or an alkanoyl group containing up to four carbon atoms:

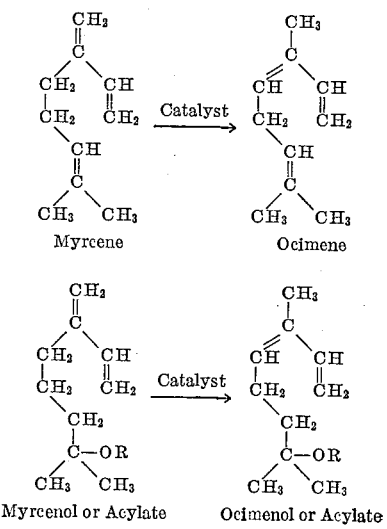

As applied to the production of allo-dihydromyrcene, the reaction may be represented as follows:

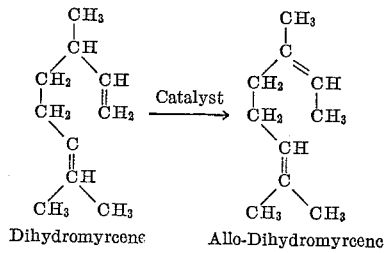

Dihydromyrcene      Allo-Dihydromyrcene

Similarly, the reaction as applied to the production of allo-dihydromyrcene derivatives may be represented by the following formula in which R has the same meaning as above:

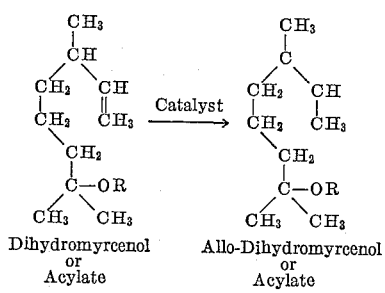

Dihydromyrcenol      Allo-Dihydromyrcenol
or                    or
Acylate               Acylate It will be seen that in each instance there is an isomerization or shift of a double bond. It will be noted also that the foregoing products may exist as mixtures of cis-trans isomers.

This invention accordingly comprises the novel processes and steps of processes, specific embodiments of which are decribed hereinafter by way of example and in accordance with which I now prefer to practice the invention.

The novel process of this invention is especially valuable because undesirable side reactions such as telomerization and polymerization are minimized, with the result that yields of final product as high as 75% or even higher are often obtained. Minimization of side reactions is accomplished by increasing the rate of the principal reaction, i.e., the isomerization reaction.

In the process of this invention isomerization is effected utilizing selected noble metal catalysts such as rhodium and iridium. The trichlorides of these metals are also useful. If metallic catalysts are employed, they are preferably supported, for example, on carbon, silica, alumina, or other reaction inert support which may be either in the powdered or pelletized form.

As aforesaid, the reaction is carried out under acid conditions. Although not essential, it is generally preferred to add acid to the reaction mixture. Often, however, such addition is not required since some of the catalysts which may be employed in this invention are acidic as a result of their method of preparation which may include, for example, an acid wash. It is specifically intended to include such catalysts and the processes in which they are used within the scope of this invention.

In the presently preferred process of carrying out this invention, hydrogen chloride either in anhydrous or aqueous form is added to the reaction mixture in any convenient manner. It may, for example, be bubbled into the mixture. Alternatively, aqueous hydrochloric acid, either dilute or concentrated, may be added. Although not essential, it is preferred to bring the reaction mixture to the operating temperature before adding the acid. It has been found that this procedure minimizes the formation of undesirable by-products during the period in which the temperature is increasing to the selected reaction temperature. Best results are obtained utilizing from about 0.5 to about 2% hydrogen chloride by weight based on the weight of terpene reactant. Concentrations somewhat above and below this preferred range can be satisfactorily employed. It is often possible to effect isomerization with catalysts which are still acidic in reaction because of washing with hydrochloric acid during manufacture. Such catalysts and their use are included within the scope of this invention.

Optimum yields are obtained while operating at a temperature of from about 60° C. to about 165° C. Below this range, the reaction is often too slow to be practical and above about 165° C. polymerization of the reactants and/or products tends to decrease the overall yields. The preferred temperature range consistent with practical reaction rates and best yields is from about 80° C. to about 110° C.

The amount of catalyst employed may be extremely low. A preferred catalyst is 2% rhodium on carbon, and this may be utilized in the range of from about 0.25% to about 15% by weight based on the weight of the terpene reactant. The amount of metallic catalyst actually present under these conditions is from about 0.004% to about 0.3%. With metallic salts it is preferred to use from about 0.25% to about 15% by weight. This is also the preferred range for unsupported metallic catalysts. The overall range for the catalysts is from about 0.004% to about 15% by weight based on the terpene reactant. This range is referred to herein as a catalytic amount.

Reaction time depends, as would be expected, on the activity of the catalyst and the reaction temperature employed. It is best to select the catalyst and reaction temperature so that reaction is complete in less than about five hours and preferably in from about ½ to about 2 hours. If the reaction is allowed to continue for more than 5 hours, the amount of by-products produced is markedly increased.

A reaction-inert organic solvent such as a saturated or aromatic hydrocarbon may be employed if desired. Benzene, toluene, heptane and petroleum ether are typical examples.

Many olefinic compounds, especially terpenes, are subject to oxidative degradation. Accordingly, best yields are obtained in carrying out the process if the mixture is protected against such degradation. This may be accomplished by the use of an inert atmosphere such as nitrogen or by the addition of an anti-oxidant of the class generally utilized to protect olefinic compounds from oxidative attack. A preferred anti-oxidant is Ionol, which is available from Shell Chemical Company, and is their brand of 2,6-di-tert-butyl-4-methylphenol. Other antioxidants, such as 3-tert-butyl-4-hydroxyanisole, hydroquinone, its methyl ether, or tert-butyl-catechol may also be satisfactorily employed. If an anti-oxidant is used, it is preferably present in an amount of from 1% to about 5% by weight based on the terpene reactant. For maximum yields it is best to protect against oxidation by using both an anti-oxidant and an inert atmosphere. Both, however, may be omitted, although the result is a somewhat decreased yield.

The products prepared may be isolated in any convenient manner. Usually they are obtained by simply filtering off the catalyst and distilling the filtrate preferably in vacuo.

The following are examples of the manner in which I now prefer to practice the invention. It is to be understood that the invention is not limited thereto except as understood in the appended claims.

*Example I*

A stirred mixture of 1000 g. (7.4 m.) of myrcene (96% pure by vapor phase chromatographic analysis), 50 g. of Ionol, and 20 g. of 2% rhodium on carbon pellets is heated to 105° C. and maitained in a nitrogen atmosphere. To this is added 10 g. of gaseous hydrogen chloride. After 4 hours at 105° C., vapor phase chromatographic analysis indicates the following: unreacted myrcene, 8%; cis ocimene, 40%; trans ocimene, 50%; impurities, 2%. The cis/trans ratio is typical in this reaction. The reaction mass is cooled, filter free of catalyst, and washed consecutively with aqueous 5% sodium carbonate solution and aqueous, saturated sodium chloride solution. It is then dried over magnesium sulfate. The oil is vacuum-distilled through an efficient fractionating column. The fractions boiling 58–62° C. C./10 mm. Hg are collected and, on vapor phase chromatographic analysis, shown to contain mixtures of cis and trans ocimene having the following constants: $n_D^{20}$ 1.4838; ultraviolet $L_{max.}$=228, $\epsilon$=28,500. Yield: 800 gms., or 80% of theory.

*Example II*

To a stirred mixture of 300 g. (2.2 m.) of myrcene (96% pure by VPC), 15 g. of Ionol, and 1.5 g. of rhodium trichloride, heated to 105° C. and maintained in a nitrogen atmosphere, is added 3 g. of concentrated aqueous hydrochloric acid. After 2 hours at 105° C. the reaction mass is cooled and treated as in Example I. Yield of ocimene: 245 g., 80% of theory.

*Example III*

A stirred mixture of 100 g. (0.74 m.) of myrcene (96% pure by vapor phase chromatographic analysis), 5 g. Ionol, 10 g. rhodium on alumina, and 1 g. of concentrated hydrochloric acid, maintained in a nitrogen atmosphere, is heated to 105° C., and after a period of 10 hours is worked up as in Examples I and II. After distillation, 25 g. of cis and trans ocimene is obtained. Yield: 25%.

*Example IV*

A stirred mixture of 100 g. (0.74 m.) of myrcene (96% pure by vapor phase chromatographic analysis), 5 g. Ionol, 1 g. of iridium trichloride crystals, and 2 gm. of concentrated hydrochloric acid maintained in a nitrogen atmosphere, after 12 hours is worked up as in Example II. After distillation, 18 g. of cis and trans ocimene is obtained. Yield, 18% of theory.

*Example V*

To a stirred mixture of 3000 g. myrcenol, 100%, 150 g. of 2% rhodium on carbon pellets, and 150 g. of Ionol heated to 100° C. and maintained in a nitrogen atmosphere is added 10 g. of anhydrous hydrogen chloride. After 4 hours at 100° C., vapor phase chromatographic analysis indicates the following: 3% hydrocarbons, 4% tetrahydro, 2,2-dimethyl 5-(1-methyl propenyl) furan, 4% tetrahydro, 2,6,6-trimethyl-2-vinyl pyran, 7% myrcenol, 8.3% cis and trans ocimenol. The reaction mixture is cooled to room temperature, filtered free of catalyst, and washed once with an equal volume: of 5% aqueous sodium bicarbonate solution, and a saturated aqueous sodium chloride solution. It is dried over magnesium sulfate. After distillation through an efficient column, approximately 1600 g. of cis and trans ocimenol is obtained. Vapor phase chromatographic analysis shows only these two isomers: B.P. (vapor temp.) 78°/2.8 mm. of Hg $n_D^{20}$ 1.4848–1.4858. Yield: 1800 gms., 60% of theory. I have discovered as described and claimed in my co-pending and concurrently filed patent application, Ser. No. 398,759, filed Sept. 23, 1964, that the cyclized ethers, i.e., the furan and pyran obtained in small quantities under the conditions described above are formed in significant yields using hydrogen chloride without the noble metal catalyst.

Example VI

To 3500 g. of myrcenyl acetate (100%), 70 g. of 2% rhodium on carbon pellets, and 175 g. of Ionol heated to 105° C. and maintained in a nitrogen atmosphere, is added 35 g. of HCl gas over a 40-minute period. A sample removed 4½ hours after the addition of the HCl reveals, after vapor phase chromatographic analysis, 95% conversion to cis-trans ocimenyl acetate; only 3% myrcenyl acetate remains. The reaction mixture is worked up as in Example V. After distillation via an efficient column, approximately 2715 g. of pure cis-trans ocimenyl acetate is collected. B.P. (vapor temp.) 79–81°/0.2 mm. of Hg $n_D^{20}$ 1.4685–1.4693. Yield, 78%.

If this reaction is carried out in the absence of an anti-oxidant, the same product is obtained, although in a somewhat decreased yield. The same is true if the anti-oxidant is used but the reaction is carried out in air. If both anti-oxidant and inert atmosphere are omitted, the yield is only 40%.

Similar results are obtained with myrcenyl formate, propionate and butyrate, both with and without the use of anti-oxidant and/or inert atmosphere.

Example VII

To a stirred mixture of 600 g. dihydromyrcene (98% pure), 30 g. Ionol, 12 g. rhodium trichloride, heated to 110° C. and maintained in a nitrogen atmosphere, is added 3 g. of hydrogen chloride gas. After 21 hours at 110° C. the reaction is terminated and on vapor phase chromatographic analysis of the reaction mixture, the following results are observed: cis and trans allo-dihydromyrcene, 65%; unreacted dihydromyrcene, 35%. The reaction mass is filtered free of catalyst and treated as in Example I. The oil is vacuum distilled through an efficient fractionating column. The fractions boiling 50–52°/8 mm. Hg are collected. $n_D^{20}$ 1.4491–1.4509. The nuclear magnetic resonance and infrared spectra support the proposed structure. Yield, 275 g., 46% of theory.

Example VIII

To a stirred mixture of 200 g. of dihydromyrcenol, 4 g. rhodium trichloride, and 1 g. Ionol, heated to 105° C. and maintained in a nitrogen atmosphere, is added 2 g. of aqueous concentrated hydrochloric acid. After 8 hours the reaction mass is cooled and worked up as in Example V. Vapor phase chromatographic analysis shows that no starting material is present. On distillation, 155 g. of cis and trans allo-dihydromyrcenol is collected. B.P. 46–48°/0.4 mm. Hg $n_D^{20}$ 1.4507–1.4513. Yield, 78%.

If the above examples are carried out using in place of 2,6-di-tert-butyl-4-methylphenol an anti-oxidant such as 3-tert-butyl-4-hydroxyanisole, hydroquinone, and hydroquinone-methyl-ether or tert-butyl-catechol, similar results are obtained.

What is claimed is:

1. A process for the preparation of a terpene compound selected from the group consisting of ocimene, ocimenol, ocimenyl alkanoates, allo-dihydromyrcene, allo-dihydromyrcenol, and allo-dihydromyrcenyl alkanoates, wherein the alkanoyl group contains up to 4 carbon atoms, which comprises contacting a reactant selected from the group consisting of myrcene, myrcenol, myrcenyl alkanoates, dihydromyrcene, dihydromyrcenol, and dihydromyrcenyl alkanoates, wherein the alkanoyl group contains up to 4 carbon atoms, at a temperature of from about 60° to about 165° C. with a catalytic amount of a catalyst selected from the group consisting of rhodium, iridium, and the trichlorides thereof in the presence of hydrogen chloride.

2. A process for the preparation of a terpene compound selected from the group consisting of ocimene, ocimenol, ocimenyl alkanoates, allo-dihydromyrcene, allo-dihydromyrcenol and allo-dihydromyrcenyl alkanoates, wherein an alkanoyl group contains up to 4 carbon atoms, which comprises contacting a reactant selected from the group consisting of myrcene, myrcenol, myrcenyl alkanoates, dihydromyrcene, dihydromyrcenol and dihydromyrcenyl alkanoates, wherein the alkanoyl group contains up to 4 carbon atoms, at a temperature of from about 60° C. to about 165° C. with a catalytic amount of a catalyst selected from the group consisting of rhodium, iridium and the trichlorides thereof in the presence of from about 0.5% to about 2% by weight of hydrogen chloride based on the weight of terpene reactant.

3. A process for the preparation of a terpene compound selected from the group consisting of ocimene, ocimenol, ocimenyl alkanoates, allo-dihydromyrcene, allo-dihydromyrcenol and allo-dihydromyrcenyl alkanoates, wherein an alkanoyl group contains up to 4 carbon atoms which comprises contacting a reactant selected from the group consisting of myrcene, myrcenol, myrcenyl alkanoates, dihydromyrcene, dihydromyrcenol and dihydromyrcenyl alkanoates, wherein the alkanoyl group contains up to 4 carbon atoms, at a temperature of from about 60° C. to about 165° C. with a catalytic amount of a catalyst selected from the group consisting of rhodium, iridium and the trichlorides thereof in the presence of from about 0.5% to about 2% by weight of hydrogen chloride based on the weight of terpene reactant in an inert atmosphere.

4. A process for the preparation of a terpene compound selected from the group consisting of ocimene, ocimenol, ocimenyl, alkanoates, allo-dihydromyrcene, allo-dihydromyrcenol, and allo-dihydromyrcenyl alkanoates, wherein an alkanoyl group contains up to 4 carbon atoms, which comprises contacting a reactant selected from the group consisting of myrcene, myrcenol, myrcenyl alkanoates, dihydromyrcene, dihydromyrcenol, and dihydromyrcenyl alkanoates, wherein the alkanoyl group contains up to 4 carbon atoms, at a temperature of from about 60° C. to about 165° C. with a catalytic amount of a catalyst selected from the group consisting of rhodium, iridium and the trichlorides thereof in the presence of from about 0.5% to about 2% by weight of hydrogen chloride and from about 1% to about 5% of an anti-oxidant selected from the group consisting of 2,6-di-tert-butyl-4-methylphenol, 3-tert-butyl-4-hydroxyanisole, hydroquinone, the methyl ether of hydroquinone and tert-butyl-catechol based on the weight of terpene reactant.

5. A process of the preparation of a terpene compound selected from the group consisting of ocimene, ocimenol, ocimenyl alkanoates, allo-dihydromyrcene, allo-dihydromyrcenol and allo-dihydromyrcenyl alkanoates, wherein an alkanoyl group contains up to 4 carbon atoms, which comprises contacting a compound selected from the group consisting of myrcene, myrcenol, myrcenyl alkanoates, dihydromyrcene, dihydromyrcenol and dihydromyrcenyl alkanoates, wherein the alkanoyl group contains up to 4 carbon atoms, at a temperature of from about 60° C. to about 165° C. with a catalytic amount of a catalyst selected from the group consisting of rhodium, iridium and the trichlorides thereof in the presence of from about 0.5% to about 2% of hydrogen chloride and from about 1% to about 5% of an anti-oxidant selected from the group consisting of 2,6-di-tert-butyl-4-methylphenol, 3-tert-butyl-4-hydroxyanisole, hydroquinone, the methyl ether of hydroquinone and tert-butyl-catechol both based on the weight of terpene reactant in an inert atmosphere.

6. A process for the preparation of a terpene compound selected from the group consisting of ocimene, ocimenol, ocimenyl alkanoates, allo-dihydromyrcene, allo-dihydromyrcenol and allo-dihydromyrcenyl alkanoates, wherein an alkanoyl group contains up to 4 carbon atoms, which comprises contacting a compound selected from the group consisting of myrcene, myrcenol, myrcenyl alkanoates, dihydromyrcene, dihydromyrcenol and dihydromyrcenyl alkanoates wherein the alkanoyl group contains up to 4 carbon atoms at a temperature of from about 80° C. to about 110 °C. with a catalytic amount of a catalyst selected from the group consisting of rhodium, iridium and the trichlorides thereof in the presence of from about 0.5% to about 2% of hydrogen chloride and from about 1% to about 5% of an anti-oxidant selected from the group consisting of 2,6-di-tert-butyl-4-methylphenol, 3-tert-butyl-4-hydroxyanisole, hydroquinone, the methyl ether of hydroquinone and tert-butyl-catechol based on the weight of terpene reactant in an inert atmosphere.

7. A process for the preparation of terepene compound selected from the group consisting of ocimene, ocimenol, ocimenyl alkanoates, allo-dihydromyrcene, allo-dihydromyrcenol and allo-dihydromyrcenyl alkanoates, wherein an alkanoyl group contains up to 4 carbon atoms, which comprises contacting a compound selected from the group consisting of myrcene, myrcenol, myrcenyl alkanoates, dihydromyrcene, dihydromyrcenol and dihydromyrcenyl alkanoates, wherein the alkanoyl group contains up to 4 carbon atoms, at a temperature of from about 60° C. to about 165° C. with a catalytic amount of a catalyst selected from the group consisting of rhodium, iridium and the trichlorides thereof in the presence of from about 0.5% to about 2% by weight of hydrogen chloride and from about 1% to about 5% by weight of 2,6-di-tert-butyl-4-methylphenol based on the weight of terpene reactant in an inert atmosphere.

References Cited

UNITED STATES PATENTS 3,205,282   9/1965   Sparke et al. _____ 260—683.2

OTHER REFERENCES

Hawkins et al.: Jour. Am. Chem. Soc., vol. 73, No. 11, November 1951, pp. 5379–81.

RICHARD K. JACKSON, *Primary Examiner.*

V. GARNER, *Assistant Examiner.*

UNITED STATES PATENT OFFICE
CERTIFICATE OF CORRECTION

Patent No. 3,344,171 September 26, 1967

Seymour Lemberg

It is hereby certified that error appears in the above numbered patent requiring correction and that the said Letters Patent should read as corrected below.

Column 2, lines 17 to 25, for that portion of the left-hand formula reading same column 2, lines 17 to 25, for that portion of the right-hand formula reading

column 4, line 5, for "maitained" read -- maintained --; line 16, for "C. C./10 mm." read -- C./10 mm. --; same column 4, lines 58 and 59, for "tetrahydro,", each occurrence, read -- tetrahydro --.

Signed and sealed this 5th day of November 1968.

(SEAL)
Attest:

EDWARD M. FLETCHER, JR.
Attesting Officer

EDWARD J. BRENNER
Commissioner of Patents